United States Patent [19]

Petcen et al.

[11] Patent Number: 4,540,532
[45] Date of Patent: Sep. 10, 1985

[54] METHOD AND APPARATUS FOR MOLDING OPHTHALMIC LENSES

[75] Inventors: Donald H. Petcen, Colonial Heights, Va.; Robert I. Sinclair, Mendham, N.J.

[73] Assignee: Coburn Optical Industries, Inc., Muskogee, Okla.

[21] Appl. No.: 576,181

[22] Filed: Feb. 2, 1984

[51] Int. Cl.³ ............................................. B29D 11/00
[52] U.S. Cl. .................................. 264/1.1; 249/112; 264/316; 425/808
[58] Field of Search .................. 264/1.1, 2.2, 2.3, 1.4, 264/1.7, 2.7, 316; 249/112; 425/808

[56] References Cited

U.S. PATENT DOCUMENTS

| 2,542,386 | 2/1951 | Beattie | 425/808 |
| 2,613,397 | 10/1952 | Borkland | 264/316 |
| 2,673,371 | 3/1954 | Uhlig | 264/316 |
| 3,325,861 | 6/1967 | Pincus et al. | 249/112 |
| 3,361,858 | 1/1968 | Wichterle | 425/808 |
| 3,423,488 | 1/1969 | Bowser | 425/808 |
| 3,475,521 | 10/1969 | Stroop | 264/316 |
| 3,552,711 | 1/1971 | DeLaney et al. | 249/112 |
| 3,894,710 | 7/1975 | Sarofien | 425/808 |
| 4,038,014 | 7/1977 | Dusza et al. | 425/808 |

FOREIGN PATENT DOCUMENTS 2040213 8/1980 United Kingdom ................ 264/1.1

Primary Examiner—James Lowe

[57] ABSTRACT

Finished and semi-finished ophthalmic lenses are made by polymerizing the monomer while it is sealed in an oxygen-impermeable envelope.

8 Claims, 2 Drawing Figures

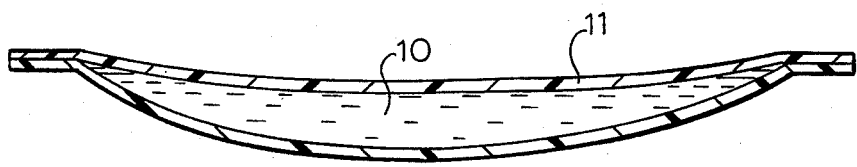
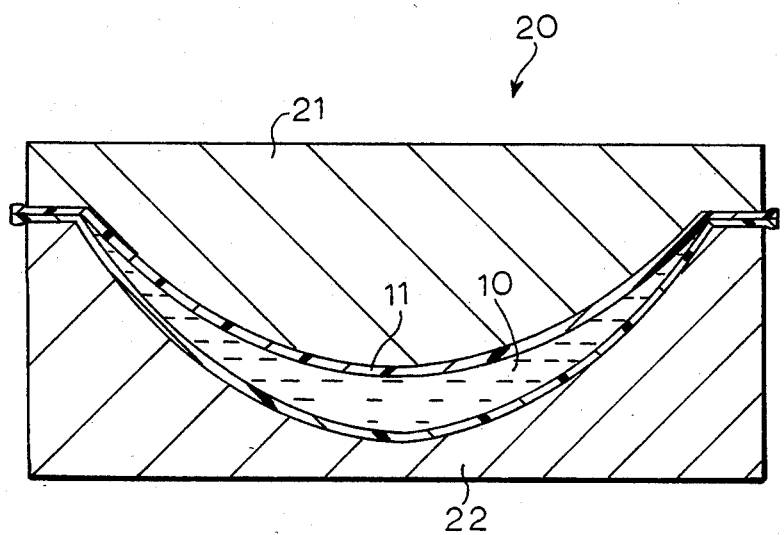

METHOD AND APPARATUS FOR MOLDING OPHTHALMIC LENSES

BACKGROUND OF THE INVENTION

This invention relates to the simultaneous molding and polymerization of articles, particularly small articles such as finished and semi-finished ophthalmic lenses. As those skilled in this art know, a "semi-finished" lens is molded with an optical surface on one side only; an optical surface is formed on the other side subsequently by grinding and polishing steps.

In the conventional method for making plastic ophthalmic lenses, a quantity of allyl digylcol carbonate monomer and a small amount (about 2.5 to 5 wt. %) of an initiator such as isopropyl peroxy percarbonate is placed into a mold. The mold is an assembly made of two mold halves whose outer edges are held 1 to 20 millimeters apart, by a plastic gasket which forms a circumferential seal in the space between the outer edges of the mold halves. The assembly is clamped into position, with a slight positive pressure on the mold, and the monomer mixture is subjected to a cycle of moderately elevated temperatures in a heated water bath or air oven to polymerize the monomer.

Monomers such as allyl diglycol carbonate shrink as the polymerization reaction proceeds. The currently known molding techniques compensate for this by starting with a sufficient amount of monomer to form the desired product, and by employing flexible material for the gasket. This operation requires that the monomer adheres to the mold halves throughout the polymerization and pulls the halves inward slightly as the material shrinks.

This technique presents numerous drawbacks. If the polymerizing monomers separate prematurely from a mold half for any reason, the molded article is generally ruined. Yet the same insistence on adhesion to the mold throughout the polymerization requires the operator to separate the fused, polymerized article from the mold, which can be a difficult task to perform successfully without breaking the mold or permanently harming its surface. Employing additives such as release agents can help, but introducing another chemical into the system can affect its behavior and raises the cost of operating.

The mold halves, which are typically made of glass or metal, must be extremely smooth and must be cleaned very thoroughly between uses. This adds considerably to the expense and time required to make a given number of lenses; the mold halves have a limited lifetime, and the cleaning solutions need to be disposed of safely.

U.S. Pat. No. 2,613,397 discloses a procedure for molding large structural articles by polymerization. A quantity of monomer is placed between sheets of a thermoplastic material in a mold. The monomer, however, does not fill the space that will be left between the mold halves after they are forced together; thus, the monomer does not even come close to taking the shape of the final polymerized article. When the mold halves are brought together, they must squeeze the monomer and force it to flow into every corner of the space left between the mold halves. This practice is undesirable in the preparation of ophthalmic lenses. The present invention avoids this practice in an inventive manner, by confining the monomer within its envelope so that it fills the mold cavity even before the mold is closed, and cannot flow away upon exertion of force by the mold halves. The method described in the U.S. Pat. No. 2,613,397 patent exposes the monomer to atmospheric oxygen. It would permit monomer to flow out of the mold completely where it is wasted, e.g. it forms a "flash" edge which must be trimmed off. The present invention avoids contact with oxygen, and prevents waste of monomer and the unnecessary creation of "flash".

SUMMARY OF THE INVENTION

One aspect of the invention is a mold assembly, for making a molded polymeric article having a predetermined shape, comprising (i) a quantity of a liquid polymerizable monomer mixture sufficient to form the desired article on polymerization thereof;

(ii) an envelope completely encasing the mixture, the envelope being characterized in that it is flexible at room temperature, essentially impermeable to oxygen, and chemically inert to said mixture, and in that its surface in contact with the monomer is essentially dust-free and conforms to within an RMS of about 1 microinch; and (iii) mold means, including a pair of mold halves disposed on opposing sides of the envelope, for forcing the envelope and its contents to conform to the inner surfaces of both mold halves, provided that the interface between said mold halves and said envelope is essentially dust-free.

Another aspect of the invention is the method of making a molded polymeric article which comprises the steps of providing a mold assembly as described in the preceding paragraph at ambient temperature, polymerizing the monomer mixture while applying to the envelope pressure which is sufficient to force the envelope and its contents to conform to the inner surfaces of both mold halves, and continuing the application of pressure at least until the material in the envelope is capable of retaining the desired molded shape without the application of pressure.

FIG. 1 is a magnified sectional view of an envelope enclosing a polymerizable liquid in accordance with the invention.

FIG. 2 is a magnified sectional view of a mold of this invention with the polymerizable material-containing envelope of FIG. 1 disposed between the mold halves.

DETAILED DESCRIPTION OF THE INVENTION

The invention can be carried out to make molded articles from any of a variety of liquid monomers, such as acrylic acid, methyl and ethyl acrylate, methacrylic acid, methyl methacrylate, vinyl acetate, and vinyl pyrrolidone. The preferred material exemplified below is allyl diglycol carbonate, commonly known by its trade name "CR-39" under which it is sold by PPG Industries, Inc.

A polymerizable monomer mixture is prepared by conventional techniques. Optional additives can be blended together with the monomer including: a crosslinking agent, such as trichloracetic acid; an ultraviolet absorber, such as a benzophenone. Suitable alternatives can readily be identified by the polymer chemist from standard published references. About 2.5 to 5.0 wt. % of isopropyl peroxy percarbonate or another equivalent initiator can be added. The objective is to prepare the monomer so that it can begin, and continue, to polymerize within the mold upon the application of heat on the order of 100° F. to 500° F. Alternatively, the monomer mixture can be "pre-polymerized", that is, partially polymerized by exposure to 100°–120° F. up to a point where the mixture is still pourable (even barely pourable).

Hereafter, the term "polymerizable monomer mixture" will be used to designate a monomer, or a mixture of monomers, with or without initiator, catalyst, and other additives, which is capable of polymerizing in a mold as described herein to form a solid fused article.

As shown in FIG. 1, significant aspect of the present invention is the sealing of a polymerizable monomer mixture 10 into an envelope 11. The envelope material should be flexible at room temperature; although some rigidity is tolerated the material should be easily bent by hand. The envelope material should also be essentially impermeable to oxygen and chemically inert to the polymerizable monomer mixture (including initiator and any optional additives). These properties can readily be ascertained by standard chemical testing. Where it is desired that the molded article have an ophthalmically acceptable surface, the envelope material should conform to a surface within an RMS of about 1 micro-inch and be essentially free of dust particles, scratches, and other cosmetic defects. Those familiar with the molding of ophthalmic surfaces are aware of the standard tests for determining whether a surface meets this criterion. Preferably the material is free from plasticizers and other additives which could migrate into the monomer mixture.

The envelope can be made from thin metal foil, e.g. aluminum foil, or polymeric film. A satisfactory envelope material is unplasticized polyester film such as that sold under the name "Melinex" by Imperial Chemical Industries, Ltd. in the U.S.A. and other countries. This film can be used with a thickness of about 2 to about 20 mils (thousandths of an inch) Another suitable material is "Aclar", a polytetrafluoroethylene film from Allied Chemical Company.

The mixture can be sealed into the envelope in a variety of ways. One alternative starts with forming a circular depression in a piece of film, by heating the film in the area to be stretched about 400° F. and simultaneously exerting a mild pressure or vacuum (10 psi) to the film. The monomer mixture is placed into the depression, and then another piece of film is sealed to the first over the mixture. Sealing can be performed by any known means appropriate to the envelope material, such as bead welding (with a hot wire passing through both pieces of film), applying ultrasonic frequency, applying an adhesive, simultaneously heating and pressing to fuse the two pieces together, or by mechanical seal. Another alternative for sealing is forming the envelope material into a bag, pouring the polymerizable monomer mixture into the bag, and sealing the mouth of the bag. It is advantageous to exclude air from within the envelope before it is sealed.

As shown in FIG. 2, monomer (optionally already pre-polymerized) is further polymerized within the sealed envelope while it is in a mold 20, which can be a pair of mold faces 21 and 22 adapted to exert pressure on the envelope while it is in the mold. The interface between the mold surface and the envelope should be essentially dust-free, so that blemishes are not pressed into the curing plastic. Depending on the desired shape of the final product, the mold faces can be both convex, both concave, one convex and one concave, or other variations. One specific possibility of interest is a concave mold half having between its midpoint and its edge a smaller slightly depressed circular area to form the "negative" of a bifocal ophthalmic lens. The mold halves can be glass, plastic, or metal, so long as they are smooth enough not to disturb the surface of the molded article through the envelope.

The mold assembly can be put in place in a number of different ways. The envelope can be filled, sealed, and then placed between the mold halves, or the filled envelope is placed there and then sealed, or the envelope is both filled and sealed while in that position. The mold halves are advantageously not heated, until the entire mold assembly is heated in order to polymerize the envelope contents.

When the envelope is in position, sufficient pressure is then applied to force the halves toward each other and to force the material in the envelope to conform to the shape of both mold halves. While care should be taken that there are no large creases in the envelope, the pressure should smooth out small wrinkles in flexible envelope material. Where the monomer undergoes shrinkage during polymerization, as is the case with "CR-39", the pressure will move the halves slightly toward each other during polymerization. The pressure should not be so high that the envelope ruptures. Pressures of up to about 125 pounds per square inch, preferably about 100 pounds per square inch, are satisfactory. The mold assembly is then heated, for instance in a water bath at 150° to 200° F., subjected to radiation, or otherwise treated to cause the monomer mixture to polymerize.

In an alternative embodiment the mold can include a circumferential wall, which can be integral with one of the mold faces, to define an edge around the molded article. Even where the wall is formed with a separate piece like a gasket, the invention is advantageous because the piece can be reused and need not be thrown out after one use as in current practice. The wall can be shaped to form any desired edge on the molded article. Where no such wall is used, the edge of the molded article will conform to the edges of the envelope; this edge can be cut after removal from the envelope, to form any desired configuration or angle. When the molded article is to be a finished or semi-finished ophthalmic lens, the wall could be parallel to the axes of the mold halves or, where no wall is employed, the molded article could be cut to make either a flat edge parallel to those axes or a beveled edge known to the art for fitting into a spectacle frame.

It should also be noted that where no side wall is employed, the envelope material and its seams should be capable of withstanding the molding pressure that is applied.

Pressure is maintained on the polymerizing mixture at least until it has become rigid enough to hold its shape when the pressure is released. Depending on the thickness and geometry of the final article, this point can be reached in as little as 5 minutes or up to 1–3 hours. The application of pressure can continue past this point, but it is advantageous to remove the article at this point so that the mold can be used again with a new batch of material to be polymerized. This is particularly advantageous because it avoids the establishment of stresses within the molded article that can be caused by the conventional molding technique.

The envelope with the partially or wholly polymerized, shape-retaining molded article is removed from the mold by releasing the pressure, separating one or both mold halves from the envelope, and removing the envelope. A significant advantage of the invention is that the envelope material need not be removed right away; the molded article can be stored in its envelope for any desired period of time, or even reimmersed in a hot water bath to help the polymerization proceed to completion. This is a particular advantage where the article is destined for use as an ophthalmic lens, since the envelope keeps the surfaces free of dirt and scratches. The envelope is eventually stripped off, and the molded article can be cut, polished, and/or ground to remove additional material to produce the desired final product.

Employing this invention affords a number of advantages not available in the present accepted practice, especially in the manufacture of lenses. There is no need to employ highly cleaned, smooth glass mold halves. Other materials may be substituted, or glass can still be employed, and ultracleaning is no longer a requisite, because there is no contact between monomer and mold. It is now permissible to employ monomer mixtures which might not adequately wet or adhere to the conventional glass mold halves, because of the properties of the monomer per se or because of additives that have been mixed in. In the case of ophthalmic lenses, other additives could include ground glass and photochromic compounds such as a silver halide. The problem of premature release of the monomer from the mold face, and the material losses which result, is eliminated because of the positive pressure applied to the mold. There is no requirement for a gasket or other separate pieces around the mold, thereby saving time and expense associated with replacing those items. The envelope permits polymerization of monomer mixtures which cannot tolerate exposure to air.

Another significant advantage is that polymerization can be carried out at higher temperatures than can be employed without the envelope. For example, "CR-39" monomer is typically cured at a temperature below 200° F. and preferably even below 190° F., particularly in the latter stages of the polymerization, because higher temperatures promote decreased adhesion of the monomer to the mold. When the molded article is intended for use as a lens, the loss of adhesion produces an unacceptable disruption of the molded surface. Now, however, polymerization can be carried out at temperatures higher than those now used in glass molds; in the case of CR-39, the temperature can be above 200° F. up to about 300° F. These advantages are not apparent from the prior art.

What is claimed is:

1. A method for making a molded polymeric article which comprises the steps of
(a) providing a mold assembly, for making a molded polymeric article having a predetermined shape, comprising
   (i) a quantity of a liquid polymerizable monomer mixture sufficient to form the desired article on polymerization thereof;
   (ii) a thin envelope completely encasing the mixture, the envelope being characterized in that it is flexible at room temperature, essentially impermeable to oxygen, and chemically inert to said mixture, and in that its surface in contact with the monomer is essentially dust-free and conforms to within an RMS of about 1 micro-inch; and
   (iii) mold means, including a pair of mold halves disposed on opposing sides of the envelope, for forcing the envelope and its contents to conform to the inner surfaces of both mold halves, provided that the interface between the mold halves and the envelope is essentially dust-free,
(b) polymerizing the monomer mixture while applying to the envelope pressure which is sufficient to force the envelope and its contents to conform to the inner surfaces of both mold halves, and
(c) continuing the application of pressure at least until the material in the envelope is capable of retaining the desired molded shape without the application of pressure.

2. The method of claim 1 wherein the polymerized article is a finished or semi-finished opthalmic lens.

3. A mold assembly, for making a molded polymeric article having a predetermined shape, comprising
   (i) a quantity of a liquid polymerizable monomer mixture sufficient to form the desired article on polymerization thereof;
   (ii) a thin envelope completely encasing the mixture, the envelope being characterized in that it is flexible at room temperature, essentially impermeable to oxygen, and chemically inert to said mixture, and in that its surface in contact with the monomer is essentially dust-free and conforms to within an RMS of about 1 micro-inch; and
   (iii) mold means, including a pair of mold halves disposed on opposing sides of the envelope, for forcing the envelope and its contents to conform to the inner surfaces of both mold halves, provided that the interface between the mold halves and the envelope is essentially dust-free.

4. The mold assembly of claim 3 wherein one of the mold halves is concave and one is convex.

5. The mold assembly of claim 3 wherein the envelope material comprises unplasticized polyester film, or polytetrafluoroethylene, and has a thickness of 0.001 to 0.010 inches.

6. The mold assembly of claim 3 further comprising a circumferential wall which seals the space between the mold halves.

7. The mold assembly of claim 6 wherein the wall is formed in one of the mold halves.

8. The mold assembly of claim 6 wherein the wall is a separate piece which is held in place between the mold halves.

* * * * *